United States Patent Office 3,303,052
Patented Feb. 7, 1967

3,303,052
OVEN COATING PROCESS
Robert A. Hatch, White Bear Lake, and James A. Tolzmann, North St. Paul, Minn., assignors to Minnesota Mining and Manufacturing Company, St. Paul, Minn., a corporation of Delaware
No Drawing. Filed Dec. 20, 1965, Ser. No. 515,242
3 Claims. (Cl. 117—169)

This application is a continuation-in-part of our copending application S.N. 140,271, filed September 25, 1961, now abandoned.

This invention relates to oven-liner compositions and processes for making surface contamination on oven surfaces readily removable.

The surfaces of stoves and ovens are particularly liable to become soiled and unsightly as the result of spillage and spattering by food stuffs which then are charred during cooking and may become detrimental to the operation of the oven. The removal of these deposits is a task which is usually undertaken only intermittently. The frequency of such cleaning is a matter of individual preference, however, repeated heating makes for thicker, harder and more difficultly removed deposits. Removal has heretofore been accomplished either by arduous, time-consuming, sheer mechanical force or by unpleasant chemical treatments which would be more appropriate to the laboratory than the home.

It is now found that certain compositions and methods permit the restoration of clean oven surfaces and the removal of carbonaceous deposits both simply and effectively.

Briefly, one coats cleaned oven surfaces with certain film-forming synthetic tetrasilicic fluorine micas in essentially aqueous dispersions and permits the coating to dry before subjection to potentially contaminating cooking operations. After the coated surfaces have become contaminated by partially insolubilized organic matter, for example, after a few days or weeks of cooking, one simply washes the coating and the contaminating material from the oven surfaces. The removal may be hastened by slight, occasional light rubbing action particularly if the deposit is quite thick.

Without describing the many variations in soiling conditions, it can be stated that extensive tests have shown that the compositions and processes embodied in this invention are very generally successful against charred food residues of all types.

The basic invention is the process comprising, applying a substantially colloidal dispersion of a water-swelling synthetic tetrasilicic fluorine-containing mica and drying it on a surface exposed to cooking contamination to give a film thereupon. Such films have the unexpected, amazing capacity of being water-releasable even when coated with at least partially heat-insolubilized organic matter and even after repeated heating. They possess a remarkable selectivity in that they are readily suspended by water but remain little penetrated by spilled foods even including syrups, greases and meat juices during cooking. Tests of many natural materials have shown that natural clays and micas when similarly coated and dried on oven surfaces may be extensively penetrated by such spilled foods which then char on repeated heating and cement the coatings in place.

The water-swelling synthetic tetrasilicic fluorine mica platelets useful in this invention are made by the methods described in Hatch, U.S. Patent No. 3,001,571, issued September 26, 1961. These are mica platelets which are in the sodium or hydrogen form and retain their ease of dispersion in water even after having been repeatedly subjected to normal oven temperatures of about 100° to 250° C. and up to about 500° C. locally. These synthetic micas may be used in combination with other materials for the purposes of this invention.

Films formed from such particles for purposes of this invention when dried to no more than 10 percent water content should be at least 0.1 mil thick. Films 10 mils or more thick are also effective and even may be preferred in some use situations. Films of whatever thickness are deposited on oven surfaces prior to contamination by food spillage and are readily removable together with the at least partially heat-insolubilized organic matter resulting from the spilled food. These films are stable at temperatures of at least about 1200° F. (670° C.) which is well above ordinary oven temperatures.

Slurries or suspensions which are used usually have a total particle solid content of not more than from about 2 to 8 weight percent. Such a slurry is applied to a solid substrate surface e.g. oven, stove or associated parts by any conventional means, such as dipping, painting, mopping, spraying, and the like. Common solid substrates used in oven construction thus include porcelain enamel, glass, stainless steel, chrome plate, chrome steel, and the like.

In addition, there may be present in the formulation a film control agent by which is meant an agent that will increase the film-forming properties of the aqueous suspension. Surfactants which permit better wetting of oven surfaces are among the most suitable film-control agents. These additives are present in small amounts which will not alter the non-combustible properties of the resulting inorganic film. In general, film control agents are present in the aerosol formulations of this invention in amounts of about 0.01 to 0.5 weight percent. In such aerosol formulations emulsants for propellant may also be included as film control agents. The amounts of film control agents are such that there is produced after application of an aerosol formulation a dry film which contains at least about 90 weight percent of synthetic, tetrasilicic fluorine mica most of the balance being water.

Essentially inert materials, insofar as the oven protecting function of the compositions is concerned may be included as desired. Such materials include for example perfumes. Another such material which is desirable when an aerosol is packaged in a metal casing is a corrosion-inhibitor.

An extremely effective aerosol formulation for purposes of this invention has been found to be one which contains from about 5 to 10 percent by weight of synthetic tetrasilicic fluorine mica platelets, from about 0.2 to 2 weight percent of silicones, all contained in an aqueous carrier. Preferred silicones for use in this formulation are such as Silicone A1100, a water-dispersed system sold by Union Carbide, whose major component is amino propyl triethoxysilane. Such a composition may be sprayed or applied with a brush or sponge as desired.

An excellent oven coating composition for inclusion in pressurized aerosol containers is essentially a suspension of 2 to 2.5 percent of synthetic tetrasilicic fluorine mica in water to which are added traces of perfume, about 0.1 percent of morpholine to decrease corrosion in the metal container and a combination of a silicone containing surfactant and a non-ionic surfactant in amounts of 0.05 and 0.01 percent respectively.

The aqueous medium (about 70 percent) is placed in an aerosol container, sealed and placed under pressure by the use of about 30 percent of halogenated hydrocarbons such as a blend of $CF_2Cl_2$ and $C_2F_4Cl_2$ as a propellent.

The invention is further illustrated by the following examples:

Example 1

An aqueous suspension of 5 weight percent water-dispersible synthetic tetrasilicic fluorine mica is prepared according to the teachings of Hatch, U.S. Patent No. 3,001,571. This suspension of synthetic tetrasilicic fluorine mica is suitable for coating on oven surfaces.

An ordinary paint brush or sponge is used as an applicator to apply the suspension uniformly to the surfaces of the oven. A short period of air-drying is employed for the removal of at least 90 percent of the free water from the coating. The resulting film thickness is at least 0.1 mil on all surfaces coated. A normal baking operation is simulated by placing food-stuff samples (hamburger, sugar, cheese, fruit mixtures including apple, cherry, and blueberry pie juices) on the coated surface and raising the temperature of the oven to 500° F. (dial setting) for a period of at least one hour. During this heating cycle the samples are partially heat-insolubilized such that charred, black, intractable masses are deposited on the coated surface. The heat-insolubilized materials are such that volatile smokes, vapors, and solid particles are coated on the entire oven surface and also on all exposed oven surfaces. After cooling the oven this heat-insolubilized organic matter is easily removed upon contacting the oven surfaces with water. A sponge and gentle rubbing action augments easy removal.

Example 2

Aqueous suspensions containing 5 weight percent of synthetic tetrasilicic fluorine mica are prepared and to them are added film-forming agents. To one suspension is added an additional 1 weight percent of "Silicone A1100" (a trademark of the Union Carbide Corporation) and to a second is added 0.01 weight percent of "Tergitol" (a trademark of the Union Carbide Corporation for its brand of alkyl phenol polyethylene glycol ethers). After blending the resulting slurry, each is painted upon surfaces of chrome steel and vitreous enamel. Each surface is then allowed to air-dry and then is placed into a simulated oven baking environment. Foodstuff samples (hamburger, sugar, cheese, fruit mixtures including apple, cherry and blueberry pie juices) are placed on the so-coated surface and the surrounding temperature raised to 500° F. (dial setting) for a period of one hour. The resulting materials each contain partially heat-insolubilized materials as evidenced by the charred, black, intractable masses deposited upon the so-coated surface. After cooling, the heat-insolubilized organic matter is readily removed by contacting the oven surfaces with water. A sponge with gentle rubbing action augments easy removal.

Example 3

Effective pressurized aerosol formulations are prepared from 60 centipoise viscosity suspensions of synthetic tetrasilicic fluorine mica (about 2.0–2.5% solids).

Sparging the suspension with nitrogen to remove dissolved oxygen may be employed but is not necessary. About 0.1 percent of a relatively odorless organic anti-corrosion amine such as morpholine or monoethanolamine is added to the suspension to counteract corrosive effects in the usual metallic aerosol containers.

A small amount, of the order of a few hundredths of a percent, of one or more compatible surface active agents are added. These assist in providing good emulsification with propellants for better spraying and also aid rapid wetting of oven surfaces before the suspension dries. Thus, 0.01 percent of a nonylphenyl ether of triethylene glycol is used together with 0.05 percent of a silicone surfactant to emulsify the propellant and assure good wetting of oven surfaces. Other materials which are compatible with the micas may be used alternatively if desired, that is other surface active materials and also inert materials such as perfume.

The composition of mica suspension in water containing about 0.1 percent corrosion inhibitor with non-ionic and silicone surface active agents and a trace (e.g. about 0.005 percent) of perfume is charged in appropriate amount in a suitable aerosol casing having dispensing, spraying or valve means and the container is then sealed. Propellant is then introduced to give a ratio of about 70 to 30 of suspension to propellant. This ratio is varied, if desired, depending upon the propellant which in this example is $CF_2Cl_2$ with or without $C_2F_4Cl_2$.

The composition is sprayed on oven surfaces and adheres and wets well on both horizontal and vertical surfaces. Heating elements in electric units are preferably not coated or the coating may be wiped off. Directing the spray at the pilot light of a gas stove may extinguish it. The coating dries rapidly. Testing of the coating is effected in a preheated oven by spattering or pouring a hot fat such as bacon grease or a vegetable oil on some areas and a hot white sauce or cherry pie filling on other surfaces followed by baking for 4 hours at 400° F. (about 200° C.). Areas protected by the process and compositions of the invention are readily cleaned manually using a wet cloth. Controls not thus protected are very difficult to clean and usually require vigorous scouring. Even when many other commercial products are used similarly cleaning is not as easy.

What is claimed is:

1. In a process for rendering oven-surfaces readily cleansed by water from heat insolubilized deposits formed during thermal cycles, the steps of applying to substantially clean oven-surfaces an aqueous composition comprising from about 2 to 10 weight percent water-dispersed hydrophilic synthetic tetrasilicic fluorine mica and thereafter drying the said composition whereby an adherent thermally resistant water-releasable coating is formed on the said oven-surfaces.

2. The process according to claim 1 wherein the aqueous composition comprises from about 2 to 10 weight percent of synthetic tetrasilicic fluorine mica and from about 0.01 to 0.5 weight percent of film control agent from the class of silicone and non-ionic surfactants.

3. The process according to claim 1 wherein the aqueous composition is applied in amount sufficient to give a thermally resistant, water-releasable coating at least about 0.1 mil in thickness containing less than about 10 percent by weight of free water after drying.

References Cited by the Examiner

UNITED STATES PATENTS

| | | | |
|---|---|---|---|
| 2,837,432 | 6/1958 | Drigot et al. | 106—14 |
| 2,906,649 | 9/1959 | Keuth et al. | 117—135.1 |
| 2,978,152 | 4/1961 | Batty | 222—394 |

ALEXANDER H. BRODMERKEL, *Primary Examiner.*

L. B. HAYES, *Assistant Examiner.*